United States Patent
Kamath et al.

(10) Patent No.: US 12,185,104 B2
(45) Date of Patent: Dec. 31, 2024

(54) SYSTEM AND METHOD FOR EFFICIENT ONBOARDING TO A WIRELESS NETWORK OF A GROUP OF WLAN DEVICES OWNED BY A USER

(71) Applicant: Cypress Semiconductor Corporation, San Jose, CA (US)

(72) Inventors: Vinayak Kamath, Mangalore (IN); Dhruvaraja Kunjar, Munnekolala (IN); Vinoth Sampath, Bangalore (IN)

(73) Assignee: Cypress Semiconductor Corporation, San Jose, CA (US)

( * ) Notice: Subject to any disclaimer, the term of this patent is extended or adjusted under 35 U.S.C. 154(b) by 292 days.

(21) Appl. No.: 17/673,554

(22) Filed: Feb. 16, 2022

(65) Prior Publication Data
US 2023/0262454 A1 Aug. 17, 2023

(51) Int. Cl.
| | |
|---|---|
| *H04L 29/00* | (2006.01) |
| *H04W 4/06* | (2009.01) |
| *H04W 4/50* | (2018.01) |
| *H04W 8/00* | (2009.01) |
| *H04W 12/06* | (2021.01) |
| *H04W 4/08* | (2009.01) |

(Continued)

(52) U.S. Cl.
CPC ............ *H04W 12/06* (2013.01); *H04W 4/06* (2013.01); *H04W 4/50* (2018.02); *H04W 8/005* (2013.01); *H04W 4/08* (2013.01); *H04W 8/02* (2013.01); *H04W 84/12* (2013.01)

(58) Field of Classification Search
CPC ......... H04W 12/06; H04W 4/06; H04W 4/50; H04W 8/005; H04W 4/08; H04W 8/02; H04W 84/12; H04W 12/04; H04W 12/35; H04W 12/50
See application file for complete search history.

(56) References Cited

U.S. PATENT DOCUMENTS

| | | | | |
|---|---|---|---|---|
| 9,172,551 | B2 * | 10/2015 | Dickens | ................ H04L 12/185 |
| 10,743,176 | B1 * | 8/2020 | Khan | ..................... H04W 12/48 |
| 10,771,967 | B2 * | 9/2020 | Hanay | ................. H04W 12/069 |

(Continued)

FOREIGN PATENT DOCUMENTS

WO  WO-2010088081 A1 * 8/2010 ........... G06F 15/177

*Primary Examiner* — Don G Zhao

(57) ABSTRACT

Methods for seamlessly onboarding commonly owned wireless local area network (WLAN) enabled devices to a wireless network are provided. Generally, the method includes exchanging an UID, encryption algorithm and key between the devices to form a common-onboarding-group (COG), manually provisioning credentials to onboard a first device of the COG, and automatically provisioning credentials to onboard a second device. In one embodiment, the first device registers with the network the UID and an encrypted-connection-profile encrypted using the algorithm, the network responds to a probe from the second device with the UID and encrypted-connection-profile, and the second device decrypts the encrypted-connection-profile using the secret key and joins the network. In another embodiment, the first device monitors the network and responds to a probe from the second device with the UID and encrypted-connection-profile. Alternatively, after onboarding the first device starts a private network and provisions the second device with the connection-profile.

19 Claims, 7 Drawing Sheets

(51) Int. Cl.
*H04W 8/02* (2009.01)
*H04W 84/12* (2009.01)

(56) References Cited

U.S. PATENT DOCUMENTS

| | | | | |
|---|---|---|---|---|
| 2010/0074446 A1* | 3/2010 | Fuchs | ................ | H04L 9/0833 380/278 |
| 2015/0023183 A1* | 1/2015 | Ilsar | ................ | H04W 48/08 370/254 |
| 2015/0023336 A1* | 1/2015 | Ilsar | ................ | H04W 48/12 370/338 |
| 2015/0026317 A1* | 1/2015 | Ilsar | ................ | H04W 24/02 709/221 |
| 2015/0071052 A1* | 3/2015 | Hershberg | ................ | H04W 24/04 370/216 |
| 2015/0071216 A1* | 3/2015 | Ilsar | ................ | H04W 48/12 370/329 |
| 2015/0130957 A1* | 5/2015 | Berelejis | ................ | H04L 12/2807 348/211.1 |
| 2015/0254704 A1* | 9/2015 | Kothe | ................ | G06Q 30/0261 705/14.26 |
| 2016/0050557 A1* | 2/2016 | Park | ................ | H04W 8/205 455/419 |
| 2017/0041296 A1* | 2/2017 | Ford | ................ | G06F 21/64 |
| 2017/0105129 A1* | 4/2017 | Teplin | ................ | G08C 17/02 |
| 2020/0228958 A1* | 7/2020 | Uddin | ................ | H04B 17/27 |
| 2020/0259705 A1* | 8/2020 | Mercier | ................ | H04W 8/005 |
| 2020/0335187 A1* | 10/2020 | Lefkofsky | ................ | G16H 50/50 |
| 2020/0344599 A1* | 10/2020 | Duo | ................ | H04W 12/50 |
| 2020/0359212 A1* | 11/2020 | Chen | ................ | H04L 63/102 |
| 2020/0359349 A1* | 11/2020 | Duo | ................ | H04W 12/03 |
| 2020/0396613 A1* | 12/2020 | Duo | ................ | H04W 12/009 |
| 2021/0014681 A1* | 1/2021 | Pang | ................ | H04W 12/04 |
| 2022/0417742 A1* | 12/2022 | Dey | ................ | H04W 12/069 |
| 2023/0224711 A1* | 7/2023 | Strater | ................ | H04W 52/42 726/4 |

* cited by examiner

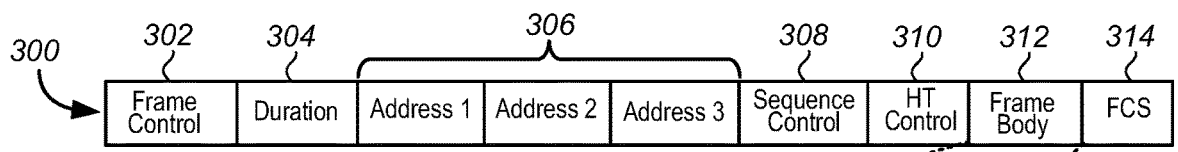
FIG. 3A
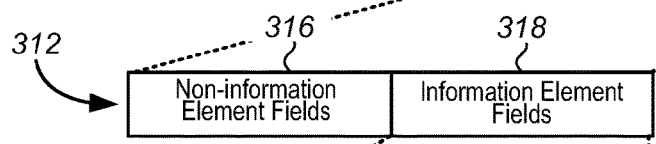
FIG. 3B
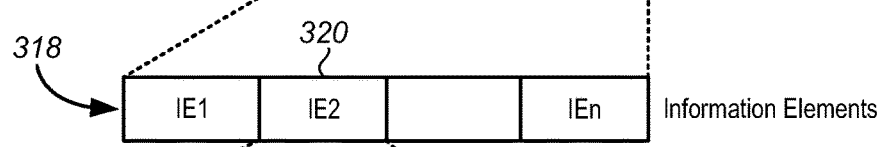
FIG. 3C
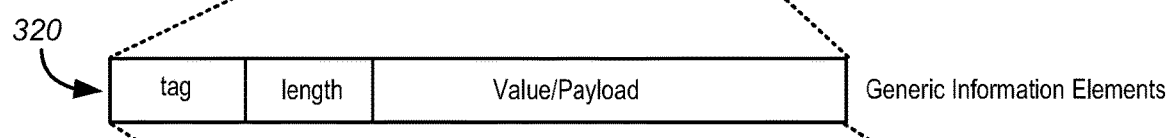
FIG. 3D
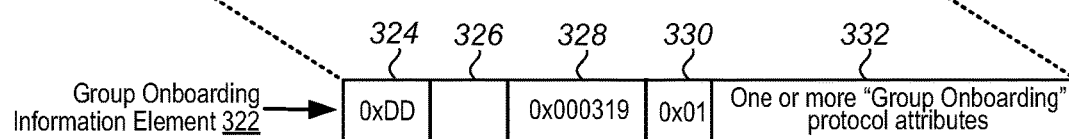
FIG. 3E
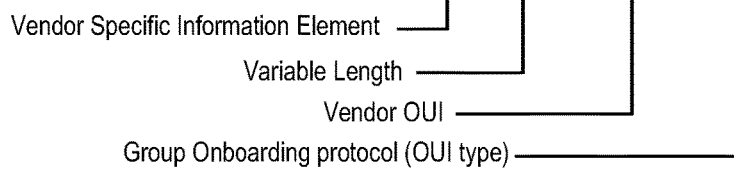

SYSTEM AND METHOD FOR EFFICIENT ONBOARDING TO A WIRELESS NETWORK OF A GROUP OF WLAN DEVICES OWNED BY A USER

TECHNICAL FIELD

This disclosure relates generally to wireless local area networks (WLAN). onboarding, and more particularly to systems and methods for provisioning of group of WLAN devices owned by a user on entering range of a new WLAN.

BACKGROUND

Wireless networks use a technology or protocol such as wireless local area networks (WLAN) that allows wireless enabled mobile devices, such as laptop and notebook computers, mobile phones, cameras, smart watches, health trackers and other wearable devices to interface with an IP network such as the Internet through a router or access point (AP).

Configuring a mobile device, to connect to an existing wireless network is known as "onboarding." Common ways to onboard a mobile device to an existing WLAN include a traditional method of having a device owner or user manually enter a Service Set Identifier (SSID) and entering a security key on the device to provision credentials to allow the device to access the WLAN. More recent methods of onboarding include Wi-Fi Protected Setup (WPS) and Wi-Fi Easy Connect. In WPS the user needs to push buttons, either physical or virtual, on both the AP and the station or device to trigger a protocol to establish a secure tunnel through which credentials are exchanged. For Wi-Fi Easy Connect, the user must acquire a uniform or universal resource identifier (URI) by scanning a quick response (QR) code (using a camera), or using another type of radio, for example, using Bluetooth, Bluetooth Extended or Near Field Communication with the device to be provisioned.

All of the above onboarding methods, while not difficult, require a user to manually initiate the onboarding process individually for each device desired to be added to the WLAN. However, as it has become quite common for people to own and carry around multiple WLAN enabled devices, including computers, mobile phones, cameras, smart watches, and health trackers, the need to repeatedly individually and manually onboard each device is time-consuming, and has become an annoying problem.

Accordingly, there is a need for a system and method for onboarding a group of wireless devices owned by a user on entering range of a new wireless local area network. There is a further need for a system and method for onboarding that is substantially automated, requiring minimal manual input or action from the user.

SUMMARY

A system, computer program and method are provided for automatically and seamlessly onboarding to a WLAN all or some devices from a group of commonly owned WLAN devices once any single device of the group is onboarded.

Generally, the method includes in a first phase exchanging a unique identifier (UID), an encryption algorithm and a secret key between the devices to form a common-onboarding-group (COG), followed in a second phase manually provisioning credentials to onboard a first device of the COG, and finally, in a third phase, automatically provisioning credentials to onboard a second device.

In one embodiment credentials for provisioning the second and subsequent devices are provided through an access point (AP) of the wireless network. Briefly, after onboarding the first device, the first device registers with the AP the UID and an encrypted-connection-profile, which is encrypted using the encryption algorithm and the secret key. Then when the second or a subsequent device in the COG queries or sends probe requests to the AP that includes the UID exchanged in forming the COG, the AP responds with a probe response including the UID and the encrypted-connection-profile. The second or subsequent device then decrypts the encrypted-connection-profile using the secret key and joins the wireless network.

In another embodiment, in the third phase credentials for provisioning the second and subsequent devices are provided directly from the first device in the COG onboarded. In this embodiment, automatically provisioning the credentials to at least the second device of the COG includes monitoring the wireless network by the first device for a probe request from the second device, the probe request including the UID, responding to the probe request by the first device with a probe response including the UID and an encrypted-connection-profile encrypted using the encryption algorithm and the secret key, and decrypting the encrypted-connection-profile in the second device using the secret key. The second device then joins the wireless network using the provisioned credentials.

In still another embodiment, credentials for provisioning the second and subsequent devices are provided from the first device over a private onboarding network (OBN). This method begins in a first phase with pre-deciding a Service Set IDentifier (SSID) or name of the OBN, and negotiating a security profile of OBN including a key management algorithm, an encryption algorithm and a secret passphrase or key (K) to secure the OBN. Values for the security profile can include, for example, DK_OBN as the SSID, Wi-Fi or Wireless Protected Access 2 (WPA2) as the key management algorithm, Advanced Encryption Standard (AES) as the encryption algorithm, and a string of characters such as ab39Ax$b as the passphrase or key for the secret key (K). Thus, the first phase in this method differs from the first phase of the previously, above described methods in that those methods do not require negotiating SSID or key management algorithm.

In a second the phase, first device of the group is connected or onboarded to a wireless network using any of the known means described above. In a third phase, the private OBN is started using the first device and a beacon broadcast over the OBN. Second and subsequent devices in the group, scanning for wireless networks, including the OBN, detect and respond to the beacon connecting to and exchanging messages with the first device over the OBN. The second subsequent devices then join the wireless network using the provisioned credentials.

Further features and advantages of embodiments of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to a person skilled in the relevant art(s) based on the teachings contained herein.

BRIEF DESCRIPTION OF THE DRAWINGS

Embodiments of the invention will now be described, by way of example only, with reference to the accompanying schematic drawings in which corresponding reference symbols indicate corresponding parts. Further, the accompanying drawings, which are incorporated herein and form part of the specification, illustrate embodiments of the present invention, and, together with the description, further serve to explain the principles of the invention and to enable a person skilled in the relevant art(s) to make and use the invention.

FIGS. 3A to 3E are block diagrams depicting an embodiment of a standard wireless frame used in probe request, probe response and action frames, to which onboarding protocol attributes can be added;

DETAILED DESCRIPTION

A system, method and computer program are disclosed for automatically and seamlessly onboarding to a wireless network WLAN enabled devices from a group of commonly owned devices once any single device of the group is onboarded. The system, method and computer program of the present disclosure are particularly useful for automatically onboarding multiple commonly owned mobile devices, such as cell phones, tablets, notebook and laptop computers, cameras, smart watches and health trackers, to public and private wireless local area networks (WLAN).

Figure 1:
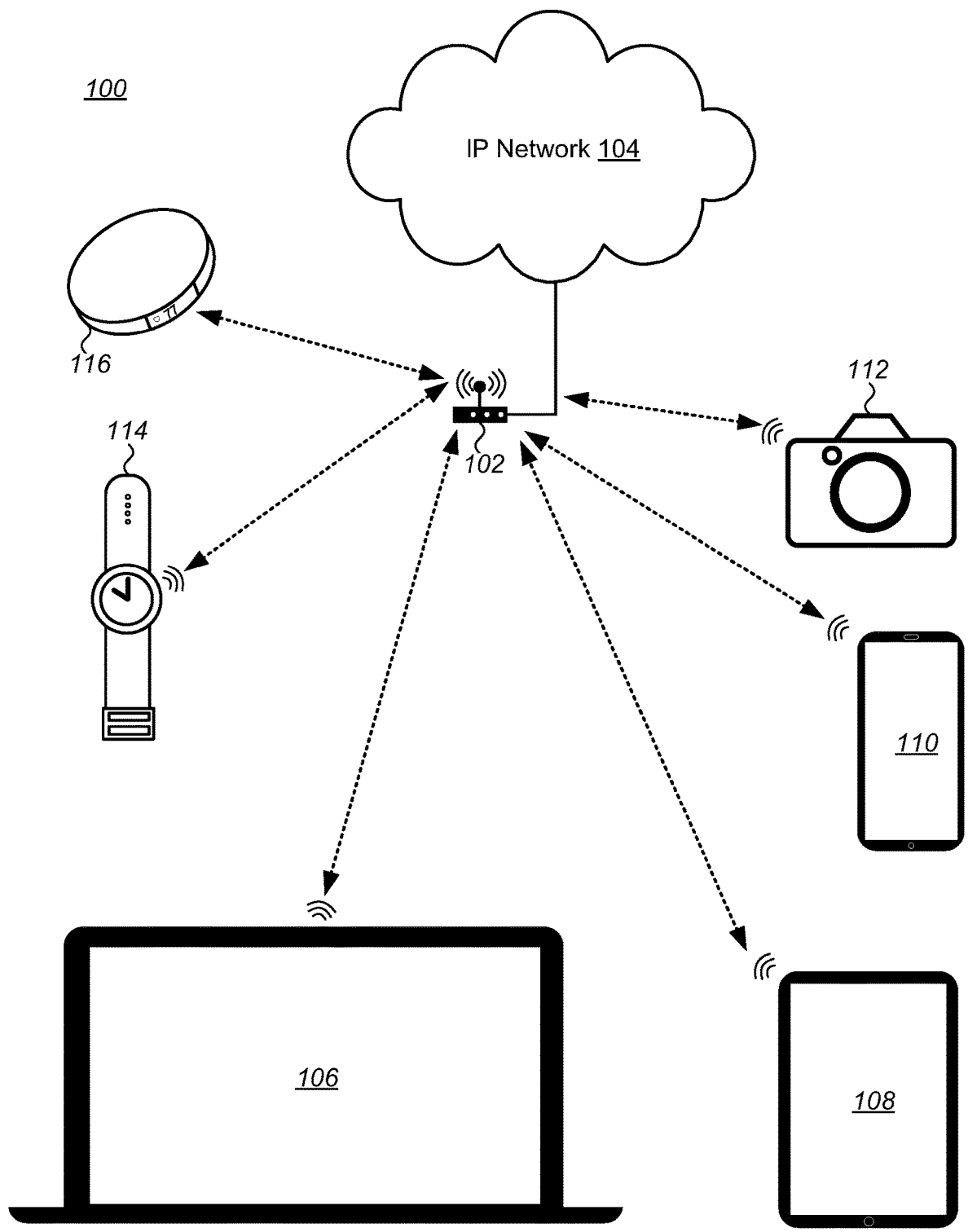
FIG. 1 is a simplified schematic block diagram illustrating a wireless network for which methods for provisioning of group of wireless devices is particularly useful.

FIG. 1 is a simplified schematic block diagram illustrating a wireless network 100 for which methods for provisioning of group of wireless devices are particularly useful. Referring to FIG. 1 the wireless network 100 generally includes an access point (AP) 102, such as a router, coupled through a hard line or physical connection, such as a fiber optic cable or an Ethernet cable, to an internet protocol network 104, such as the Internet. Typically the wireless network 100 further includes a number of wireless enabled devices wirelessly coupled to the router 102 through one of a number of wireless networking protocols. In one embodiment the wireless network 100 is a WLAN and wireless enabled devices include one or more computers 106, such as a laptop or notebook computer, tablets 108, mobile phones 110, cameras 112, smart watches 114, health trackers 116 and other wearable devices. In accordance with the present disclosure, some or all of these wireless enabled devices 106, 108, 110, 112, 114 and 116, may be owned or used by a single common user and can be grouped together to form a group of commonly owned devices or COG, and to be automatically and seamlessly onboarded to the wireless network once any single device of the group has been onboarded.

Figure 2A:
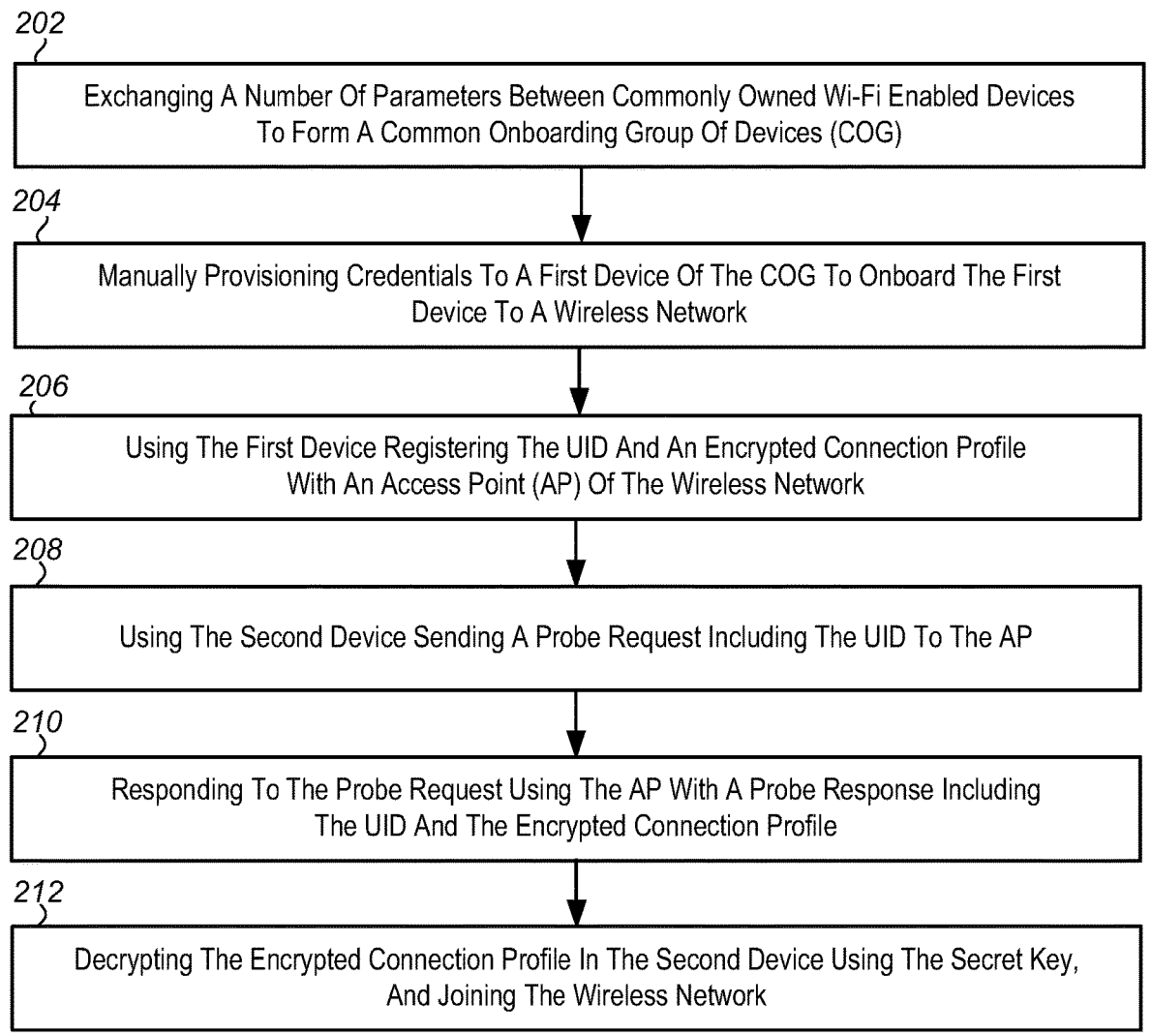
FIG. 2A a flowchart illustrating an embodiment of a method for provisioning of group of wireless devices in which an access point in the wireless network assists in credential distribution to second and subsequent devices.
Figure 2B:
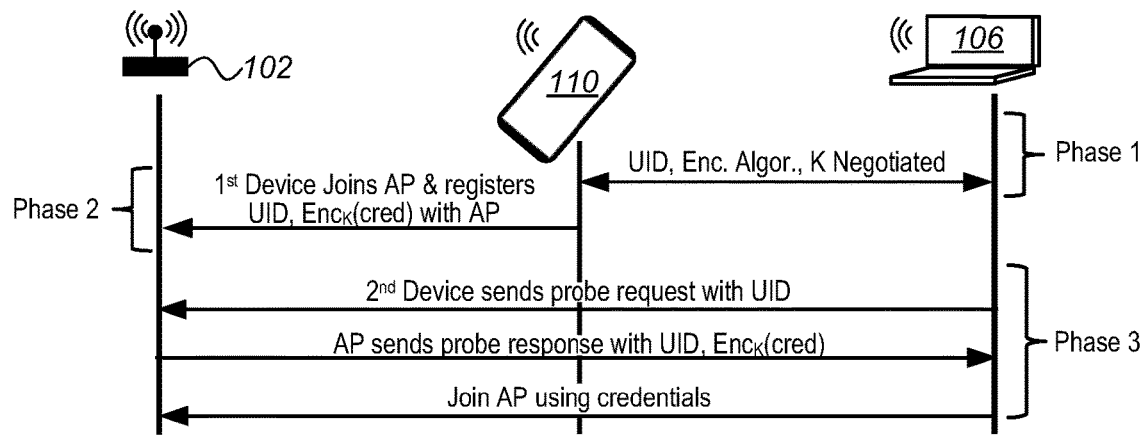
FIG. 2B a schematic block diagram illustrating the method of FIG. 2A.

An embodiment of a method for provisioning of group of wireless devices in which the AP 102 in the of the wireless network 100 assists in credential distribution to a second and subsequent devices group of commonly owned devices will now be described with reference to the flowchart of FIG. 2A and schematic block diagram of FIG. 2B. Referring to FIGS. 2A and 2B, the method begins in a first phase (Phase 1) with exchanging a number of attributes between commonly owned WLAN enabled devices to form a COG (step 202). As shown in FIG. 2B the COG includes at least a first device, such as a mobile phone 110, and a second device, such as a computer 106, and the number of attributes exchanged can include a negotiated unique ID (UID), an encryption algorithm (Enc.Algor.) and secret key (K). Generally, the forming of the COG occurs once per device prior to entering range of a new wireless network, and requires only some connectivity for devices to communicate. Suitable connectivity between the devices can include connection through a local area network (LAN), through a wireless local area network (WLAN), through near field communication (NFC) tags, through a Bluetooth or Bluetooth Extended (BLE), or optically by scanning a quick response (QR) code using cameras in the device being added to the COG.

Next, in a second phase (Phase 2) on entering range of a wireless network for a first time a user manually provisions credentials to the first device (mobile phone 110) of the COG to onboard the first device to the wireless network 100 (step 204), and automatically registering the UID and an encrypted connection profile (Enc.K(cred) in 2B) with the AP of the wireless network (step 206). Generally, the manual onboarding of the first device by the user need only be performed once on entering range of a new wireless network, and can be accomplished by any existing on-boarding mechanism including Wi-Fi Protected Setup (WPS), Wi-Fi Easy Connect, scanning a QR code or manual entering WLAN credentials. The encrypted connection profile is encrypted using the encryption algorithm (Enc.Algor.) and secret key (K) previously negotiated in Phase 1.

Referring again to FIGS. 2A and 2B, next in a third phase (Phase 3) the second device (computer 106) sends a probe request including the UID to the AP 102 (step 208). The AP 102 responds with a probe response including the UID and the encrypted connection profile ($Enc._K(cred)$ in 2B) (step 210), and the second device decrypts the encrypted connection profile using the encryption algorithm and secret key, and joins the wireless network 100 and using the credentials provisioned thereby (step 212).

In some embodiments, the UID, an encryption algorithm, and secret key can be added as part of a wireless frame or packet used in probe request, probe response or action frames. FIGS. 3A to 3E are block diagrams depicting an embodiment of a standard wireless frame 300 to which onboarding protocol attributes, including UID and/or encrypted credentials can be added.

Referring to FIG. 3A, the wireless frame 300 typically includes multiple elements or fields including frame control 302, duration 304, and number of address fields 306, sequence control 308, higher throughput (HT) control 310, frame body 312 and frame check sequence (FCS 314). Referring to FIG. 3B, the frame body 312 can include both non-information fields 316 and information fields 318.

Referring to FIG. 3C, the information fields 318 can include multiple information elements (IE 320) shown here as IE1 through IEn. Referring to FIG. 3D information in generic information elements (IE 320) is typically stored in the type or tag, length, and value or TLV format. Referring to FIG. 3E, thus group onboarding protocol attributes can be stored in a single IE in the wireless frame 300 used for a probe request or probe response. The embodiment shown, the group onboarding information element 322 can include Vendor specific IE 324, a variable length field 326, a vendor organizational unique identifier (OUI 328), a group onboarding protocol 330, and a value/payload field 332 in which one or more group onboarding protocol attributes are stored.

Figure 4A:
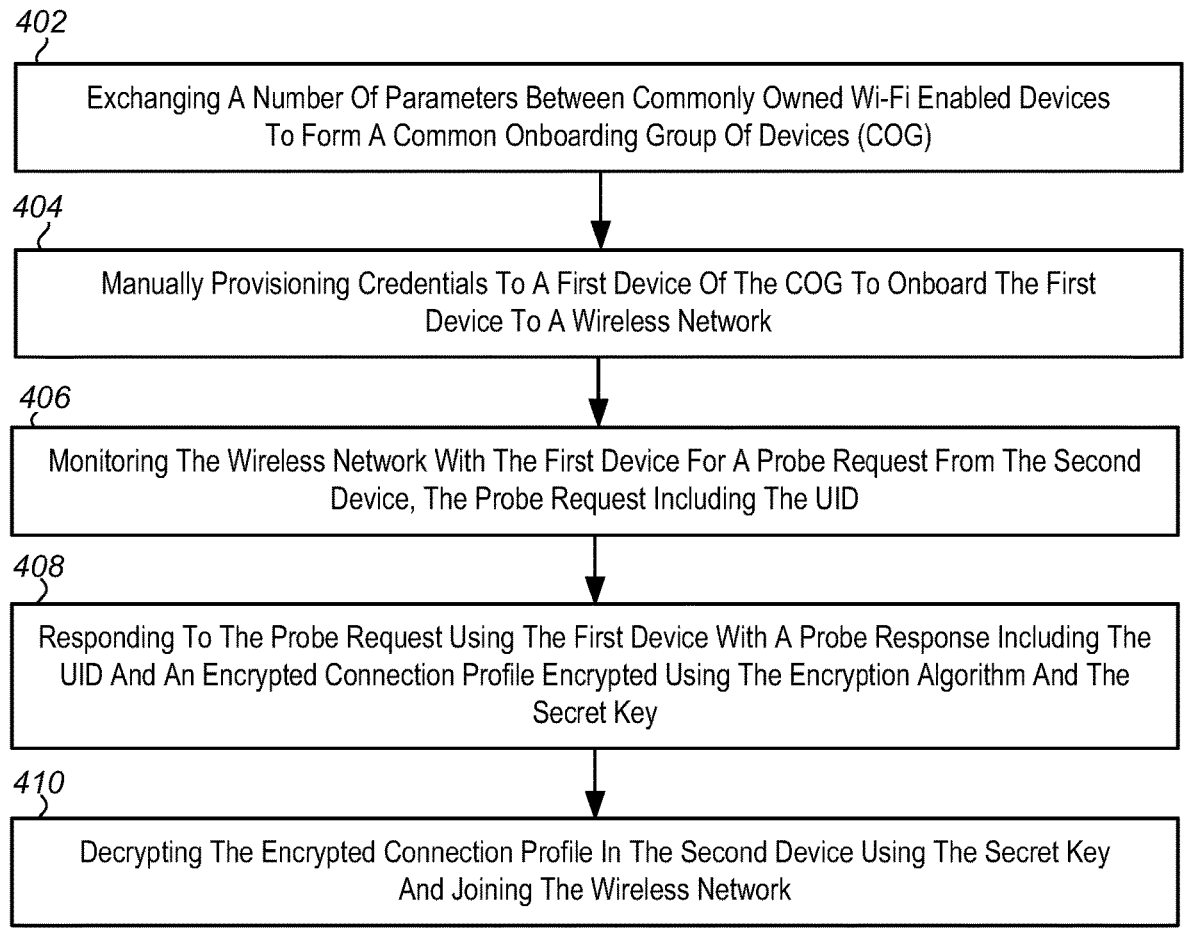
FIG. 4A a flowchart illustrating an embodiment of a method for provisioning of group of wireless devices in which a first device onboarded to the wireless network provides credentials to second and subsequent devices.
Figure 4B:
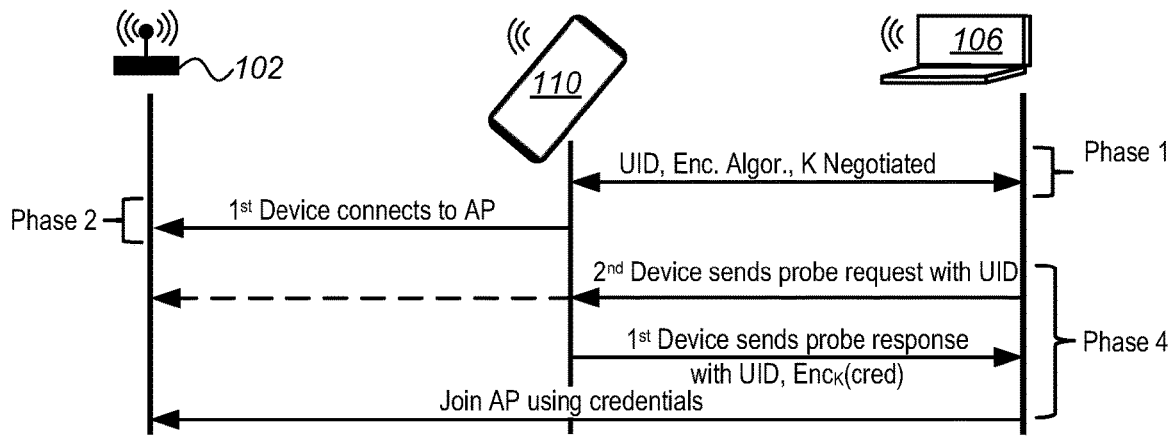
FIG. 4B a schematic block diagram illustrating the method of FIG. 4A.

FIGS. 4A and 4B a illustrate an embodiment of another method for automatically provisioning a number of wireless devices in the COG following onboarding of a first device without a need for assistance from an AP. Referring to FIGS. 4A and 4B, the method begins in a first phase (Phase 1) with exchanging the number of attributes between commonly owned WLAN enabled devices to form a COG (step 402), and in a second phase (Phase 2) manually provisioning credentials to the first device (shown in FIG. 4B as mobile phone 110) of the COG to onboard the first device to the wireless network 100 (step 404). These steps are substantially the same as described in steps 202 and 204 in the AP assisted method described above.

In a third phase (Phase 3) the first device monitors the frequency or channel of the wireless network 100 for a probe request including the UID from the second device (shown in FIG. 4B as computer 106) (step 406). As illustrated in FIG. 4B by the dashed arrow this probe request may be received by the AP 102 because the probe request is transmitted on the same channel or frequency used by the wireless network 100, and the second device is in range of the AP.

The first device responds to the probe request with a probe response including the UID and an encrypted connection profile encrypted using the encryption algorithm (Enc.Algor.) and secret key (K) previously negotiated in Phase 1 (step 408). Note, the AP 102 also responds to the probe request. However, as the AP 102, unlike in the previous method, does not include instructions or software that would enable the AP to recognize the special request from second device (i.e., the request being made special due to the presence of UID in the probe request), it will respond to the probe request with response, as it usually does with a normal, conventional probe response that does not include UID and $Enc_K(Cred)$, and is ignored by the second device.

Finally, the second device decrypts the encrypted connection profile using the encryption algorithm and secret key, and joins the wireless network 100 and using the credentials provisioned thereby (step 410).

As described above with reference to FIGS. 3A through 3E, the UID, encrypted connection profile, and secret key (K) exchanged in the probe request (step 406) and probe response (step 406) can be added in existing WLAN frame formats designed for such exchanges.

Figure 5A:
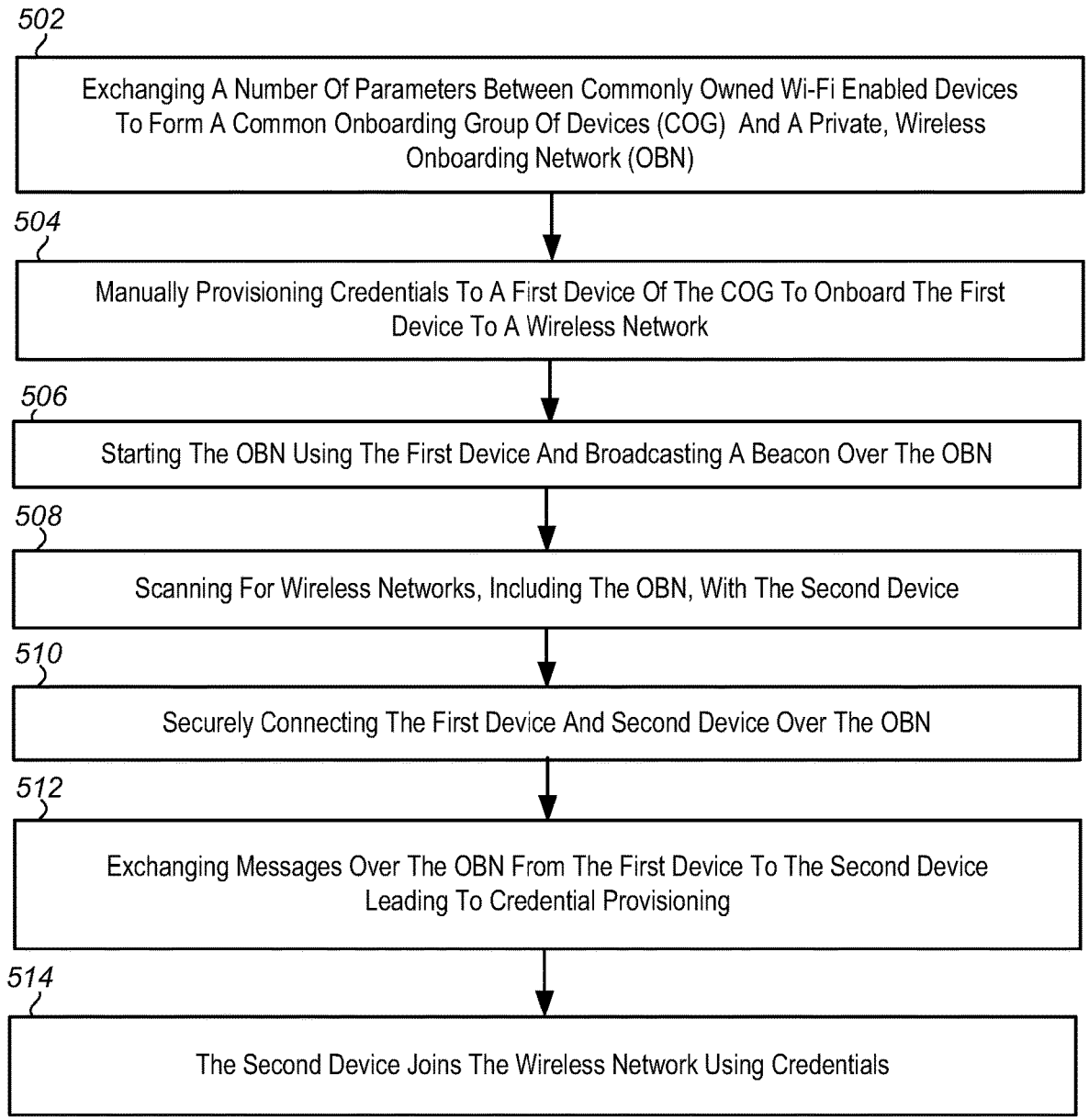
FIG. 5A a flowchart illustrating an embodiment of a method for provisioning of group of wireless devices in which a first device onboarded to the wireless network provides credentials to second and subsequent devices over a private onboarding network.
Figure 5B:
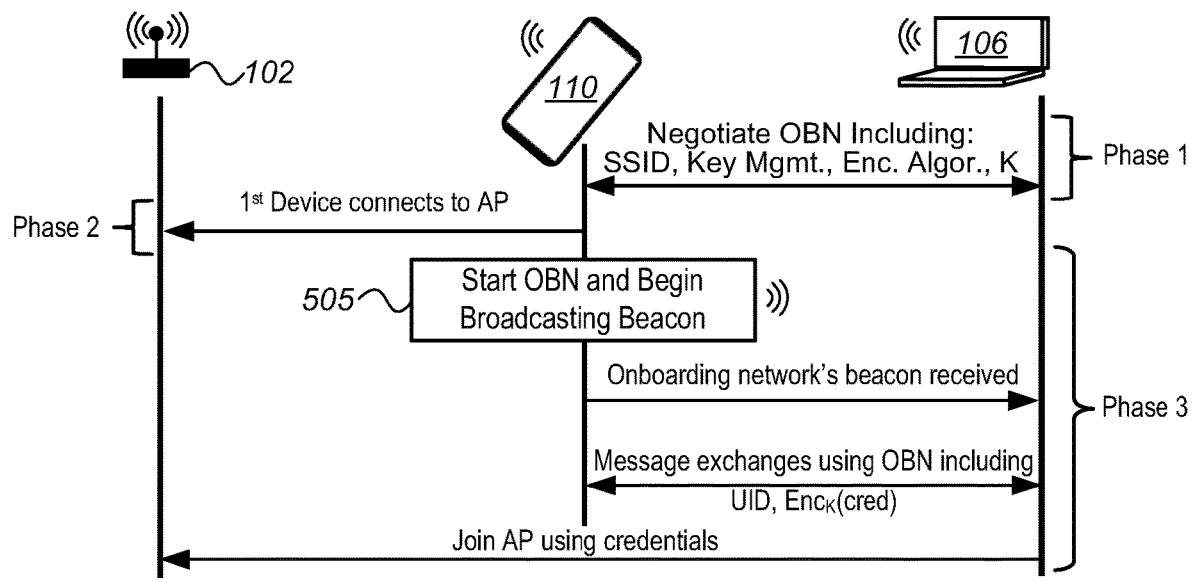
FIG. 5B a schematic block diagram illustrating the method of FIG. 5A.

FIGS. 5A and 5B a illustrate an embodiment of yet another method for automatically provisioning a number of wireless devices in the COG following onboarding of a first device in which the first device onboarded to the wireless network provides credentials to second and subsequent devices over a private onboarding network. Referring to FIGS. 5A and 5B, the method begins in a first phase (Phase 1) with exchanging or negotiating a number of attributes between commonly owned WLAN enabled devices to form a COG and a secure, private onboarding network (OBN) (step 502). As in the methods described previously attributes exchanged to form the COG can include a negotiated unique ID (UID), an encryption algorithm (Enc.Algor.) and secret key (K). Additional attributes that are exchanged to form the OBN include deciding a Service Set IDentifier (SSID) or name of the OBN, and a key management algorithm. Values for these attributes can include, for example, DK_OBN as the SSID, Wi-Fi or Wireless Protected Access 2 (WPA2) as the key management algorithm, Advanced Encryption Standard (AES) as the encryption algorithm, and a string of characters such as ab39Ax$b as the passphrase or key for the secret key (K). Thus, the first phase in this method differs from the first phases of the previously, above described methods in that those methods do not require negotiating SSID or key management algorithm.

In a second phase (Phase 2), a first device (shown in FIG. 5B as mobile phone 110) of the COG is manually provisioned with credentials to onboard the first device to the wireless network 100 (step 504). The step of manually onboarding the first device is substantially the same as described in steps 204 and 404 in the AP assisted methods described above.

In a third phase (Phase 3) the first device starts a private, secure, wireless, onboarding network (OBN 505) and begins broadcasting a beacon carrying the OBN's network name (step 506). Though, here the OBN uses traditional WLAN Access Point concept to enable connectivity to rest of the members of the COG to request for credentials, other WLAN protocol such as Wi-Fi Aware, or Wi-Fi Direct protocol, can be used. Alternatively, the OBN 505 can include a non-Wi-Fi protocol or technology including, for example, Bluetooth or BLE. To conserve power of the first device the first device may host the OBN 505 for only a predetermined time, for example fifteen minutes after the first device is onboarded. To conserve power the first device may turn off its radio after waiting for queries of other members of COG for a predetermined time (example 10 milli second) after sending out periodic beacons of OBN. Additionally or alternatively the first device can be configured or operable to stop broadcasting the beacon and hosting the OBN 505 after all devices of the COG, including the second device, have been onboarded. In another scheme, the first on-boarded device might periodically (e.g.: once every 30 seconds) turn on the OBN network for a brief period (e.g.: turning on radio for 1 second, sending out 10 beacons and responding to queries during this period).

Referring again to FIGS. 5A and 5B, the second device scans for wireless networks, including the OBN 505, (step 508), and on receiving the beacon on the OBN securely connects the first device and second device over the OBN (step 510). Next, the first device then exchanges messages to or with the second device over the OBN that contains the connection profile (step 512). Finally, the second device and joins the wireless network 100 and using the credentials provisioned thereby (step 514).

In another aspect the present disclosure is directed to a computer program or application including instructions stored in computer-readable storage medium in multiple commonly owned WLAN devices that, when executed by a processor in each WLAN device, cause the WLAN device to form a common onboarding group of devices (COG), and when the WLAN device is a first WLAN device in the COG onboarded to a wireless network, to automatically provision credentials to at least a second WLAN device of the COG to onboard the second WLAN device to the wireless network.

Figure 6:
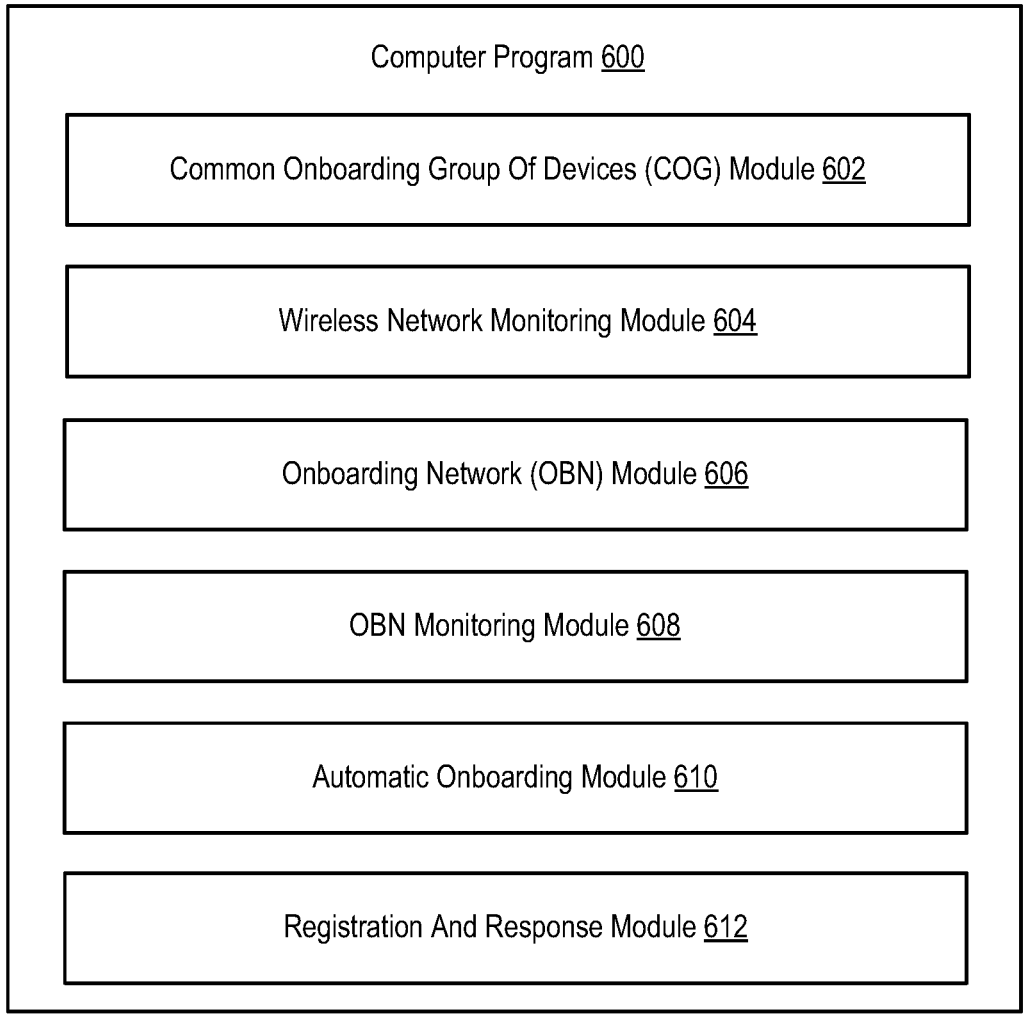
FIG. 6 is a simplified schematic block diagram illustrating a computer program residing in a memory in a wireless device for automatically onboarding a second and subsequent wireless device in a group of commonly owned devices once a first device is onboarded.

A simplified schematic block diagram illustrating an embodiment of one such computer program 600 is illustrated in FIG. 6.

Referring to FIG. 6 the computer program 600 generally includes a COG module 602 including instructions to exchange a unique ID (UID), an encryption algorithm and secret key between a plurality of commonly owned WLAN devices to form a common onboarding group of devices (COG). As noted above, the forming of the COG requires connectivity between the wireless devices to communicate these attributes. Generally, the COG module 602 can include instructions to enable the WLAN devices to connect through a LAN, WLAN, Bluetooth or BLE, or through NFC tags, or optically by scanning a QR code.

In one embodiment, the computer program 600 can further include a wireless network monitoring module 604 including instructions operable to cause the first WLAN device onboarded to the wireless network to monitor signals sent over the channel or frequency of the wireless network for a probe request from a second or subsequent WLAN device, and to respond to the probe request with a probe response including the UID and an encrypted connection profile encrypted using the encryption algorithm and the secret key. As noted above, the probe request can include the UID, and the probe response can include the UID and an encrypted connection profile encrypted using the previously negotiated encryption algorithm and the secret key.

In another embodiment, the computer program 600 can further include an onboarding network (OBN) module 606 operable to cause the first WLAN device after onboarding to start a private, wireless OBN and broadcast a beacon over the OBN, and an OBN monitoring module 608 including instructions operable to cause the second WLAN device to: scan for wireless networks, including the OBN; securely connect with the first WLAN device over the OBN; exchange messages with the first WLAN device over the OBN, to receive the connection profile.

The OBN module 606 can include instructions to start a WLAN protocol wireless network, including, for example, a Hotspot, Wi-Fi Aware, or Wi-Fi Direct protocol. Alternatively, OBN module 606 can include instructions to start a non-Wi-Fi protocol or technology including, for example, Bluetooth or Bluetooth Low Energy.

Additionally, the OBN module 606 can include instructions to conserve power of the first device used to host the OBN. As noted above, the methods of conserving power can include limiting a time for which the first device hosts the OBN to only a predetermined time, for example fifteen minutes after the first device is onboarded or turn off the radio after waiting for probe requests from members of COG for a pre-determined time after broadcasting periodic beacons. Alternatively, the OBN module 606 can include instructions to stop broadcasting the beacon and hosting the OBN after all devices of the COG, including the second device, have been onboarded. Alternatively, it can enable OBN periodically only for a fixed short duration.

Finally, the computer program 600 can further include an automatic onboarding module 610 including instructions operable to cause the second and subsequent WLAN devices to decrypt the encrypted connection profile using the secret key, and to automatically onboard to the wireless network.

Alternatively or additionally in some embodiments in which the AP 102 in the of the wireless network 100 assists in credential distribution to a second and subsequent devices in the COG, the computer program can further include a Registration and Response Module 612 including instructions stored in computer-readable storage medium in the AP that, when executed by a processor in the AP, is operable to cause the AP to receive and register the UID and an encrypted connection profile from the first WLAN device onboarded, and to respond to a probe request from a second or subsequent WLAN device with a probe response including the UID and the encrypted connection profile, to implement the AP assisted method described above with reference to FIGS. 2A and 2B.

Thus, methods for automatically and seamlessly onboarding to a wireless network WLAN enabled devices from a group of commonly owned devices once any single device of the group is onboarded have been disclosed. Embodiments of the present invention have been described above with the aid of functional and schematic block diagrams illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

It is to be understood that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The breadth and scope of the present invention should not be limited by any of the above-described exemplary embodiments, but should be defined only in accordance with the following claims and their equivalents.

What is claimed is:

1. A method comprising:
   exchanging a number of attributes between commonly owned wireless local area network (WLAN) enabled devices to form a common onboarding group of devices (COG), wherein exchanging the number of attributes includes negotiating between all commonly owned WLAN enabled devices a unique ID (UID), an encryption algorithm and a secret key to be used by each WLAN enabled device of the COG;
   manually provisioning credentials to a first device of the COG to onboard the first device to a WLAN, wherein manually provisioning credentials includes using the first device registering with an access point (AP) to the WLAN the UID and an encrypted connection profile encrypted using the encryption algorithm and the secret key; and
   automatically provisioning the credentials to at least a second device of the COG to onboard the second device to the WLAN, wherein automatically provisioning credentials the second device includes using the second device sending a probe request including the UID exchanged between the commonly owned wireless WLAN enabled devices of the COG prior to manually provisioning credentials to the first device of the COG.

2. The method of claim 1 wherein the exchanging the number of attributes between commonly owned WLAN enabled devices comprises establishing communication between the commonly owned WLAN enabled devices electronically using a local area network (LAN), a wireless network, near field communication (NFC), or a Bluetooth protocol, or optically using a quick response (QR) code.

3. The method of claim 1 wherein the exchanging the number of attributes between commonly owned WLAN enabled devices is accomplished manually by a user, or automatically using a User Datagram Protocol (UDP) or TCP to discover a previously unowned device and add it to the COG.

4. The method of claim 1 wherein automatically provisioning the credentials to at least the second device of the COG comprises:
sending the probe request including the UID directly to the AP;
responding to the probe request using the AP with a probe response including the UID and the encrypted connection profile previously registered with the AP using the first device; and
decrypting the encrypted connection profile in the second device using the encryption algorithm and secret key and onboarding the second device to the WLAN.

5. The method of claim 1 wherein automatically provisioning the credentials to at least the second device of the COG comprises:
monitoring the WLAN with the first device for a probe request from the second device, the probe request including the UID;
responding to the probe request using the first device with a probe response to the second device, the probe response including the UID and as the encrypted connection profile previously registered with the AP using the first device; and
decrypting the encrypted connection profile in the second device using the encryption algorithm and the secret key and onboarding the second device to the WLAN.

6. The method of claim 5 wherein automatically provisioning the credentials to at least the second device of the COG comprises:
starting a private, wireless onboarding network (OBN) using the first device and broadcasting a beacon over the OBN;
scanning for wireless networks, including the OBN, with the second device;
securely connecting the first device and second device over the OBN;
exchanging messages over the OBN from the first device to the second device, the messages including the encrypted connection profile encrypted using the encryption algorithm and the secret key; and
decrypting the encrypted connection profile in the second device using the encryption algorithm and the secret key and onboarding the second device to the WLAN.

7. The method of claim 6 wherein the OBN comprises a wireless protocol including hotspot, Wi-Fi Aware, or Wi-Fi Direct, and is secured using WLAN security standard protocols, or a non-Wi-Fi technology including Bluetooth.

8. The method of claim 6 wherein starting the OBN and broadcasting the beacon comprises hosting the OBN for only a predetermined time after the first device is onboarded.

9. The method of claim 6 wherein starting the OBN and broadcasting the beacon comprises broadcasting the beacon periodically for only a predetermined time.

10. The method of claim 6 wherein starting the OBN and broadcasting the beacon comprises hosting the OBN for only a predetermined time after the beacon is broadcast and discontinuing hosting the OBN if a response is not received from the second device after the predetermined time.

11. The method of claim 6 wherein starting the OBN and broadcasting the beacon comprises stopping the OBN after all devices of the COG, including the second device, have been onboarded.

12. The method of claim 1 wherein manually provisioning credentials to the first device of the COG to onboard the first device to the wireless network is performed once by a user upon entering range of the WLAN.

13. The method of claim 12 wherein manually provisioning credentials to the first device of the COG to onboard the first device to the wireless network is accomplished using Wi-Fi Protected Setup, Wi-Fi Easy Connect, a quick response (QR) code, or by the user manually entering of the credentials for the WLAN.

14. A system comprising:
a plurality of commonly owned wireless local area network (WLAN) devices, each WLAN device including:
a processor; and
a computer-readable storage medium having stored therein instructions which, when executed by the processor, cause the WLAN device:
to exchange attributes including a negotiated unique ID (UID), encryption algorithm and secret key between the WLAN device and all other WLAN devices of the plurality of commonly owned WLAN devices to form a common onboarding group of devices (COG); and
when the WLAN device is a first WLAN device in the COG to enter range of a WLAN, to manually provision credentials to onboard the WLAN device to the WLAN, wherein manually provisioning credentials includes using the WLAN device registering with an access point (AP) to the WLAN the UID and an encrypted connection profile encrypted using the encryption algorithm and the secret key; and
when the WLAN device is not the first WLAN device in the COG to enter range of the WLAN, to automatically provision credentials to the WLAN device of the COG to onboard the WLAN device to the WLAN, wherein automatically provisioning credentials the WLAN device includes using the WLAN device sending a probe request including the UID, and receiving a probe response including the UID and the encrypted connection profile.

15. The system of claim 14 wherein the instructions further comprise instructions that when executed by the processor:
cause the first WLAN device of the COG to enter range of the WLAN to monitor signals sent over the WLAN for a probe request from a second WLAN device of the COG, the probe request including the UID, and to respond to the probe request with the probe response including the UID and the encrypted connection profile; and cause the second WLAN device to decrypt the encrypted connection profile using the secret key, and to automatically onboard to the WLAN.

16. The system of claim 14 wherein the instructions further comprise instructions that when executed by the processor:
cause the first WLAN device of the COG to enter range of the WLAN after onboarding to start a private, wireless onboarding network (OBN) and broadcast a beacon over the OBN; and
when the WLAN device is not the first WLAN device in the COG to enter range of the WLAN cause the WLAN device to:
scan for wireless networks, including the OBN;
securely connect with the first WLAN device over the OBN;
exchange messages with the first WLAN device over the OBN, the messages including the UID and encrypted connection profile to automatically provision credentials to the WLAN device; and
to onboard the WLAN device to the WLAN.

17. A computer program stored in computer-readable storage medium in a plurality of commonly owned wireless local area network (WLAN) devices, the computer program including instructions that when executed by a processor in each WLAN device cause the WLAN device:
to exchange attributes including a negotiated unique ID (UID), an encryption algorithm and secret key between the WLAN device and all other WLAN devices of the plurality of commonly owned WLAN devices to form a common onboarding group of devices (COG); and
when the WLAN device is a first WLAN device in the COG to enter range of a WLAN, to manually provision credentials to onboard the WLAN device to the WLAN, wherein manually provisioning credentials includes using the WLAN device registering with an access point (AP) to the WLAN the UID and an encrypted connection profile encrypted using the encryption algorithm and the secret key; and
when the WLAN device is not the first WLAN device in the COG to enter range of the WLAN, to automatically provision credentials to the WLAN device to onboard the WLAN device to the WLAN, wherein automatically provisioning credentials the WLAN device includes using the WLAN device sending a probe request including the UID, and receiving a probe response including the UID and the encrypted connection profile.

18. The computer program of claim 17 wherein the instructions further comprise instructions that when executed by the processor:
cause the first WLAN device of the COG to enter range of the WLAN, after onboarding to monitor signals sent over the WLAN for a probe request from a second WLAN device of the COG, the probe request including the UID, and to respond to the probe request with the probe response including the UID and the encrypted connection profile; and
cause the second WLAN device to decrypt the encrypted connection profile using the secret key, and to automatically onboard to the WLAN.

19. The computer program of claim 17 wherein the instructions further comprise instructions that when executed by the processor:
cause the first WLAN device of the COG to enter range of the WLAN after onboarding to start a private, wireless onboarding network (OBN) and broadcast a beacon over the OBN; and
when the WLAN device is not the first WLAN device in the COG to enter range of the WLAN, cause the WLAN device to:
scan for wireless networks, including the OBN;
securely connect with the first WLAN device over the OBN;
exchange messages with the first WLAN device over the OBN, the messages including the UID and encrypted connection profile to automatically provision credentials to the WLAN device; and
to onboard the WLAN device to the WLAN.

* * * * *